(12) United States Patent
Zoni et al.

(10) Patent No.: US 8,657,101 B2
(45) Date of Patent: Feb. 25, 2014

(54) CONVEYING APPARATUS FOR ARTICLES AND PLANT FOR HANDLING SUCH ARTICLES COMPRISING SAID CONVEYING APPARTUS

(71) Applicant: SIDEL S.p.A. con Socio Unico, Parma (IT)

(72) Inventors: Roberto Zoni, Parma (IT); Vincenzo Galotto, Parma (IT)

(73) Assignee: SIDEL S.p.A. con Socio Unico (IT)

( * ) Notice: Subject to any disclaimer, the term of this patent is extended or adjusted under 35 U.S.C. 154(b) by 0 days.

(21) Appl. No.: 13/713,878

(22) Filed: Dec. 13, 2012

(65) Prior Publication Data

US 2013/0146421 A1    Jun. 13, 2013

(30) Foreign Application Priority Data

Dec. 13, 2011 (IT) .............................. TO2011A1145

(51) Int. Cl.
*B65G 29/00* (2006.01)

(52) U.S. Cl.
USPC ......... 198/608; 198/611; 198/612; 198/459.2

(58) Field of Classification Search
USPC ........... 198/469.1, 472.1, 441, 457.07, 470.1, 198/478.1, 374, 778, 339.1, 575, 608
See application file for complete search history.

(56) References Cited

U.S. PATENT DOCUMENTS

| | | | |
|---|---|---|---|
| 3,858,500 A * | 1/1975 | Rohm et al. ................... 99/504 |
| 4,125,184 A | 11/1978 | Seragnoli | |
| 4,467,908 A * | 8/1984 | Schneider ..................... 198/441 |
| 7,093,705 B2 * | 8/2006 | Ohiro et al. .............. 198/377.08 |
| 8,028,815 B2 | 10/2011 | Hahn | |
| 8,307,977 B2 | 11/2012 | Nguyen et al. | |
| 2011/0308916 A1 * | 12/2011 | Fahldieck .................. 198/470.1 |

FOREIGN PATENT DOCUMENTS

| | | |
|---|---|---|
| DE | 102006035109 A1 | 1/2008 |
| DE | 102010018216 A1 | 10/2011 |
| EP | 0659683 A1 | 6/1995 |
| EP | 2301867 A2 | 3/2011 |
| FR | 2919595 A1 | 3/2011 |
| WO | WO 2010124768 A1 * | 11/2010 ............. B65G 47/84 |

OTHER PUBLICATIONS

"Italian Application Serial No. IT T020111145, Search Report dated Oct. 8, 2012", 3 pgs.

* cited by examiner

*Primary Examiner* — Gene Crawford
*Assistant Examiner* — Lester Rushin
(74) *Attorney, Agent, or Firm* — Schwegman Lundberg & Woessner, P.A.

(57) ABSTRACT

There is disclosed a conveying apparatus for articles, provided with a first conveyor having an inlet section for articles to be conveyed and an outlet section for the articles, and with a second conveyor which can be selectively set in communication with a transfer section of the first conveyor; the first conveyor is selectively set in a first operative release configuration of the articles at the outlet section and in at least one second operative release configuration of the articles at its transfer section; the second conveyor is selectively set in a first operative withdrawal configuration of the articles from the first conveyor at its transfer section and at least in one second operative inhibition configuration of this withdrawal.

14 Claims, 10 Drawing Sheets

CONVEYING APPARATUS FOR ARTICLES AND PLANT FOR HANDLING SUCH ARTICLES COMPRISING SAID CONVEYING APPARTUS

PRIORITY CLAIM AND RELATED APPLICATIONS

This application claims the benefit of priority under 35 U.S.C. Section 119 to Italian Patent Application Serial No. TO2011A 001145, filed on Dec. 13, 2011, which application is incorporated herein by reference in its entirety.

The present invention relates to a conveying apparatus for articles, in particular containers, such as for example bottles, and to a plant for handling such articles comprising said conveying apparatus.

The present invention can advantageously although not exclusively be applied to the conveying of bottles between two or more handling machines, comprising for example a blowing machine used for the production of plastic bottles, a filling machine for said bottles and a labelling machine for the bottles.

BACKGROUND OF THE INVENTION

In known bottling processes, the need is especially felt to avoid down times of plants in case of malfunctioning of one or several of the handling machines and reduce at maximum the number of discarded bottles.

Furthermore, again in the sector of bottling, solutions are continuously sought allowing the use of plants with a high flexibility, so as to better exploit the whole potentiality of the different handling machines.

Finally, in some operative conditions, it could be convenient to have the possibility of actuating two or more machines of the plant positioned in a sequence one with respect to another at different speeds. This is currently impossible in the known types of plants.

SUMMARY OF THE INVENTION

Various examples provide a conveying apparatus that can satisfy one or more of these needs in a simple and cost-effective manner.

The abovementioned examples are achieved by examples that relate to a conveying apparatus for articles as defined in claim 1.

The present subject matter further relates to a handling plant for articles as defined in claim 14.

BRIEF DESCRIPTION OF THE DRAWINGS

Some preferred embodiments are hereinafter disclosed for a better understanding of the present invention, by mere way of non-limitative example and with reference to the accompanying drawings, in which.

FIGS. from 3 to 5 show a diagrammatic top view on an enlarged scale of a part of the conveying apparatus of FIGS. 1 and 2, arranged in different operative configurations.

DETAILED DESCRIPTION OF THE INVENTION

With reference to FIGS. 1, 3, 4 and 5, numeral 1 shows as a whole a conveying apparatus made according to the dictates of the present subject matter for conveying articles, in particular containers, in a handling plant 2 of such articles.

Figure 1:
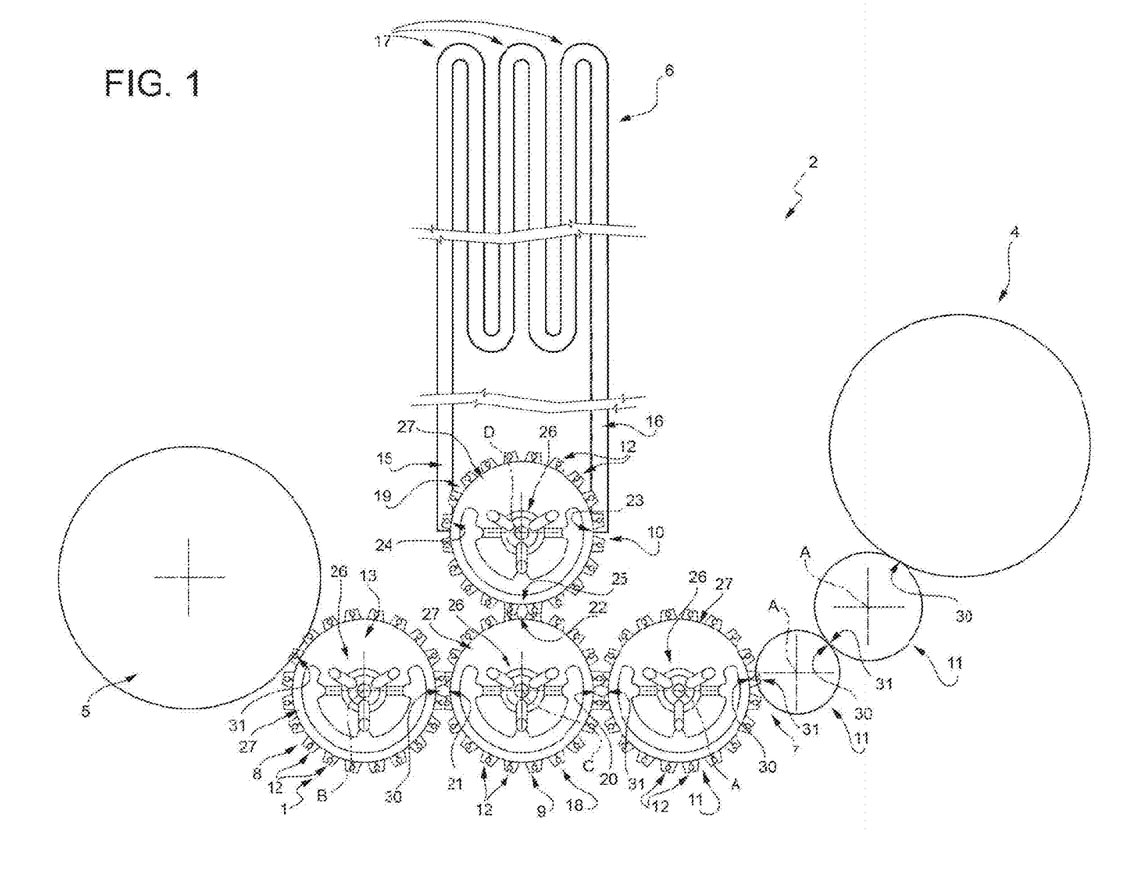
FIG. 1 shows a diagrammatic top view of an example of a conveying apparatus for articles, made according to the present subject matter and used in a first type of handling plant of the above said articles.

In the embodiment shown, conveying apparatus 1 is used for transporting a particular type of article and precisely plastic bottles 3.

Plant 2, which is shown, substantially comprises an upstream handling machine 4 (only diagrammatically shown), for example a blowing machine for the production of bottles 3, a downstream handling machine 5 (also only diagrammatically shown), for example a filling machine for previously formed bottles 3 or a labelling machine, and a reservoir 3 for the possible temporary accumulation of bottles 3 during the transfers within plant 2.

Bottles 3 are transferred by means of conveying apparatus 1 from machine 4 to machine 5, or from machine 4 to reservoir 6 or from reservoir 6 to machine 5.

Conveying apparatus 1 substantially comprises an inlet conveyor 7 for displacing bottles 3 received from upstream machine 4, an outlet conveyor 8 for feeding bottles 3 to downstream machine 5, and a pair of switching conveyors 9, 10, interposed between conveyors 7 and 8 and a reservoir 6 and selectively configurable to transfer the above said bottles 3 from conveyor 7 to conveyor 8 or from conveyor 7 to reservoir 6 or from reservoir 6 to conveyor 8.

In the example shown, conveyor 7 is formed by a plurality of star wheels 11, in this case three, which are adapted to transport bottles 3 in a condition in which they hang by the neck.

In particular, each star wheel 11 is configured to rotate about a vertical axis A thereof and is provided peripherally with a plurality of gripping clamps 12, angularly equally spaced from one another about axis A and selectively displaceable between a closed position on relative bottles 3 and an open or release position from bottles 3.

Conveyor 7 is herein shown as formed by three star wheels 11 but, depending on the structural design of plant 2, could also comprise a different number of star wheels; for example, conveyor 7 could be formed by a single star wheel configured as outlet conveyor of machine 4.

In the example shown, conveyor 8 is formed by a single star wheel 13, of the same type as star wheels 11 forming conveyor 7, i.e. configured to rotate about a vertical axis B thereof and provided peripherally with a plurality of gripping clamps 12, displaceable between a closed position on relative bottles 3 and an open or release position from bottles 3.

Also in this case, conveyor 8, herein shown as formed by a single star wheel 13, could also comprise a different number of star wheels, depending on the structural design of plant 2.

Reservoir 6 substantially comprises a pair of linear conveyors 15, 16, for example belt, air or chain conveyors, and a plurality of conveyor rings 17 defining the accumulation capacity of reservoir 6.

In the example shown, conveyor 15 is used to transfer bottles 3 from conveyor 7 to conveyor rings 17, while conveyor 16 is used to transfer bottles 3 from conveyor rings 17 towards conveyor 8.

Switching conveyors 9, 10 are formed by respective star wheels 18, 19 of the same type of star wheels 11 and 13, i.e. configured to rotate about respective vertical axes C, D and peripherally provided with respective pluralities of gripping clamps 12 displaceable between a closed position on relative bottles 3 and an open or release position from bottles 3.

Conveyor 9 has an inlet section 20 for receiving bottles 3 to be conveyed, an outlet section 21 of bottles 3, and a transfer section 22, which is interposed between inlet section 20 and outlet section 21 along a first conveying line R of bottles 3 from conveyor 7 to conveyor 8 and can be selectively set in communication with reservoir 6 through conveyor 10.

Figure 4:
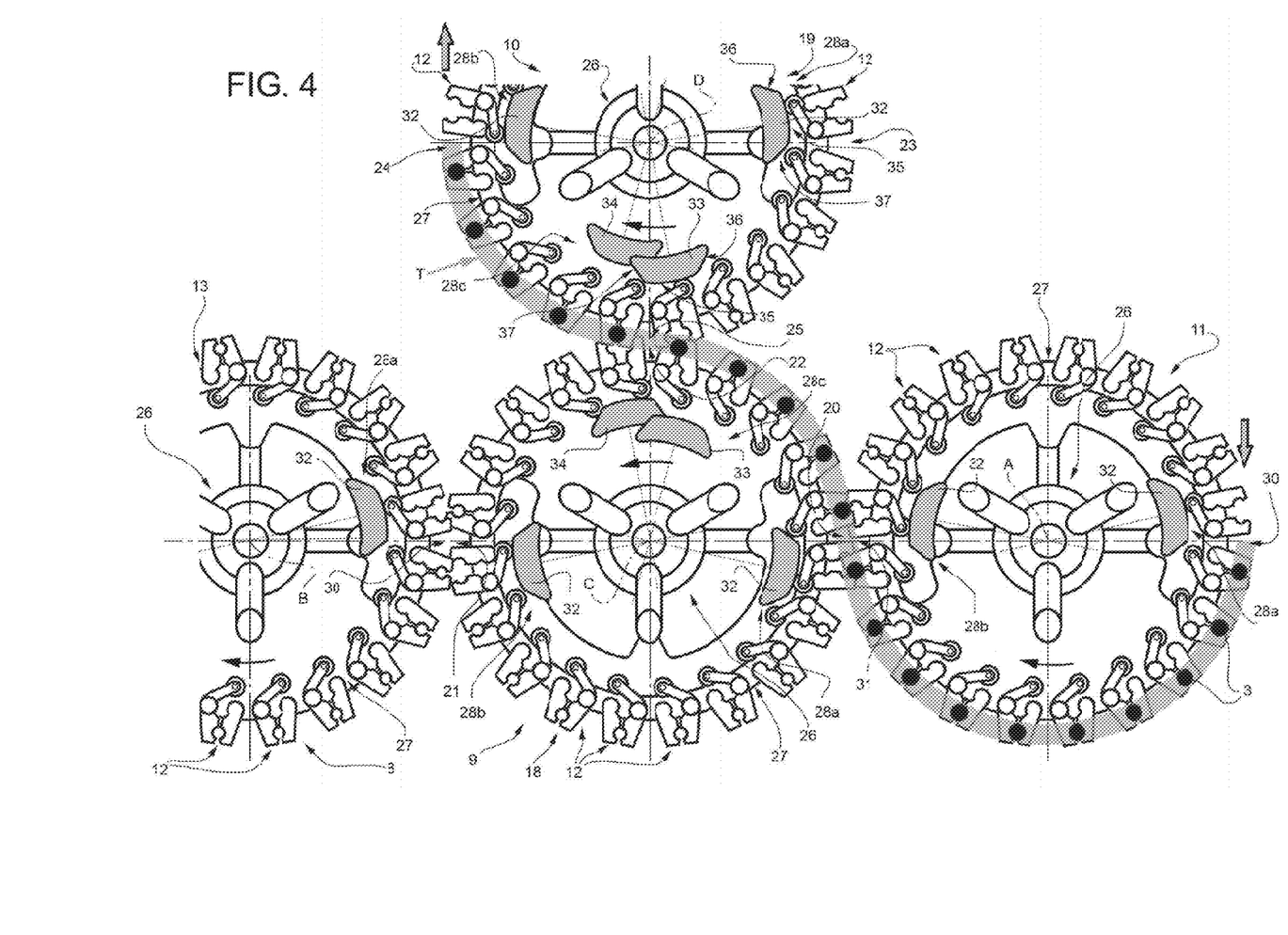
Figure 5:
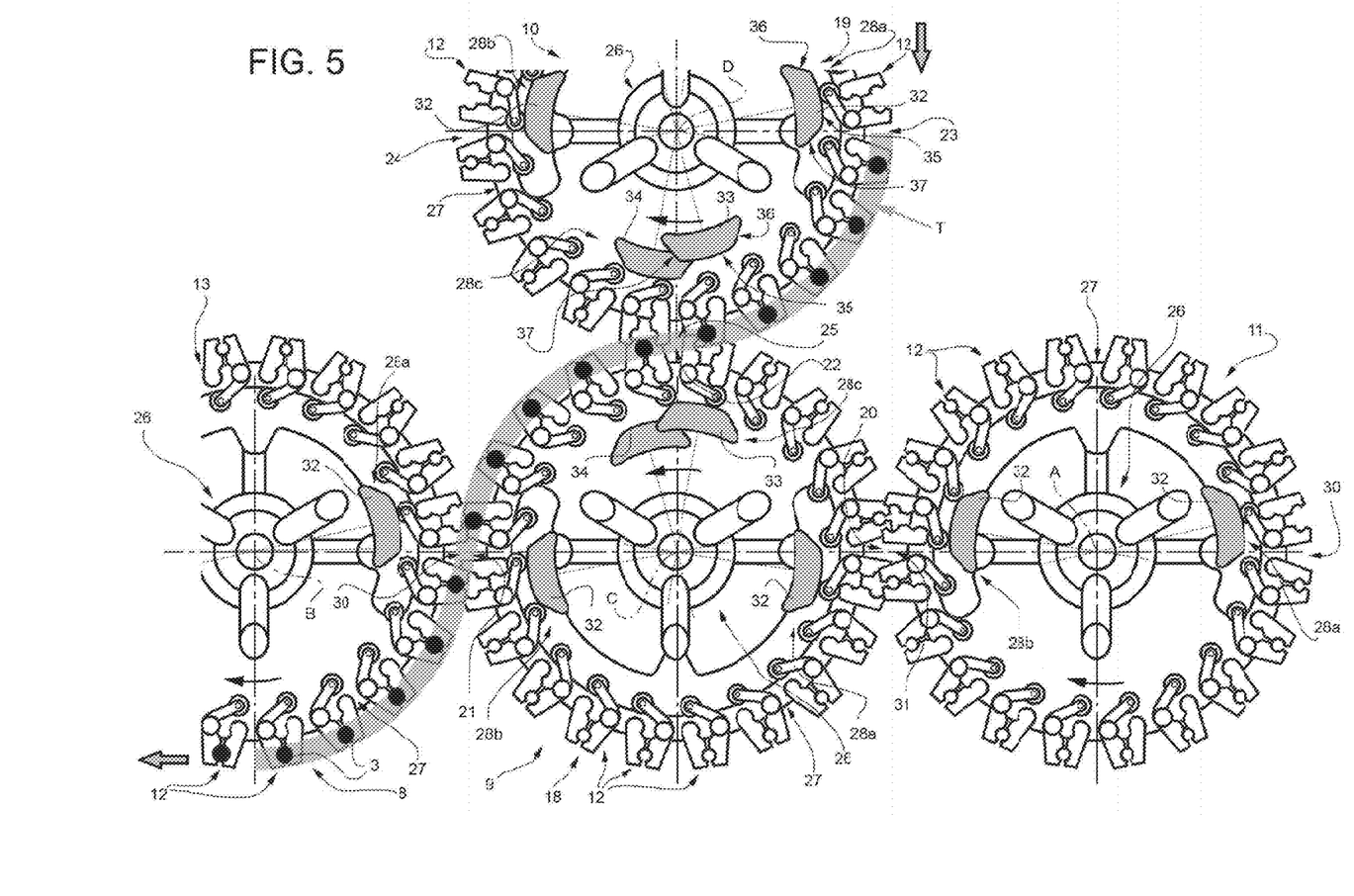

Conveyor 9 is selectively set in three distinct operative configurations: a first operative configuration, in which it receives bottles 3 at inlet section 20 and releases them at outlet section 21 (FIG. 3); a second operative configuration, in which it receives bottles 3 at inlet section 20 and releases them at transfer section 22 (FIG. 4); and a third operative configuration, in which it receives bottles 3 at transfer section 22 and releases them at outlet section 21 (FIG. 5).

In particular, in the first operative configuration of conveyor 9 (FIG. 3), relative clamps 12 are always maintained in the closed position at transfer section 22; in the second operative configuration of conveyor 9 (FIG. 4), relative clamps 12 are instead displaced from the closed position to the open position at transfer section 22; finally, in the third operative configuration of conveyor 9 (FIG. 5), relative clamps 12 are displaced from the open position to the closed position at transfer section 22.

In a similar way to conveyor 9, conveyor 10 has an inlet section 23 for receiving bottles 3 from conveyor 16 of reservoir 6, an outlet section 24 of bottles 3 communicating with conveyor 15, and a transfer section 25 which can selectively be set in communication with transfer section 22 of conveyor 9. Conveyor 10 is selectively set in three distinct operative configurations: a first operative configuration, in which it withdraws bottles 3 from conveyor 9 at its transfer section 25 and releases them to conveyor 15 of reservoir 6 at outlet section 24 (FIG. 4); a second operative inhibition configuration of the above said withdrawal, in which conveyor 10 does not interact with conveyor 9 (FIG. 3); and a third operative configuration, in which it receives bottles 3 from conveyor 16 of reservoir 6 at its inlet section 23 and releases them to conveyor 9 at its transfer section 25 (FIG. 5).

As can be seen in particular in FIG. 4, the second operative configuration of conveyor 9 and the first operative configuration of conveyor 10 define a second conveying line S of bottles 3 from conveyor 7 to reservoir 6, distinct from conveying line R; furthermore (FIG. 5), the third operative configurations of conveyors 9 e 10 define a third conveying line T of bottles 3 from reservoir 6 to conveyor 8, distinct from conveying lines R and S.

In greater detail, in the first operative configuration of conveyor 10 (FIG. 4), relative clamps 12 are displaced from the open position to the closed position at transfer section 25; in the second operative configuration of conveyor 10 (FIG. 3), the relative clamps are instead always maintained in the open position at transfer section 25; finally, in the third operative configuration of conveyor 10 (FIG. 5), relative clamps 12 are displaced from the closed position to the open position at transfer section 25.

With reference to figures from 1 to 5, each star wheel 11, 13, 18 and 19 comprises a fixed support structure 26, a rotating part 27, mounted rotatably on support structure 26 and provided with relative clamps 12, and cam means 28a, 28b, 28c borne by support structure 26 to interact with clamps 12 and displace them between the open and closed positions.

In the example shown, clamps 12 of each star wheel 11, 13, 18 and 19 are normally arranged in the closed position and are displaced to the open position by the effect of the interaction with relative cam means 28a, 28b, 28c.

Each star wheel 11, 13 is essentially provided with an inlet section 30 for receiving bottles 3 and with an outlet section 31 of bottles 3; for these star wheels 11, 13 no other types of transfer of bottles 3 are provided in other sections other than the above said inlet and outlet sections 30, 31.

Figure 3:
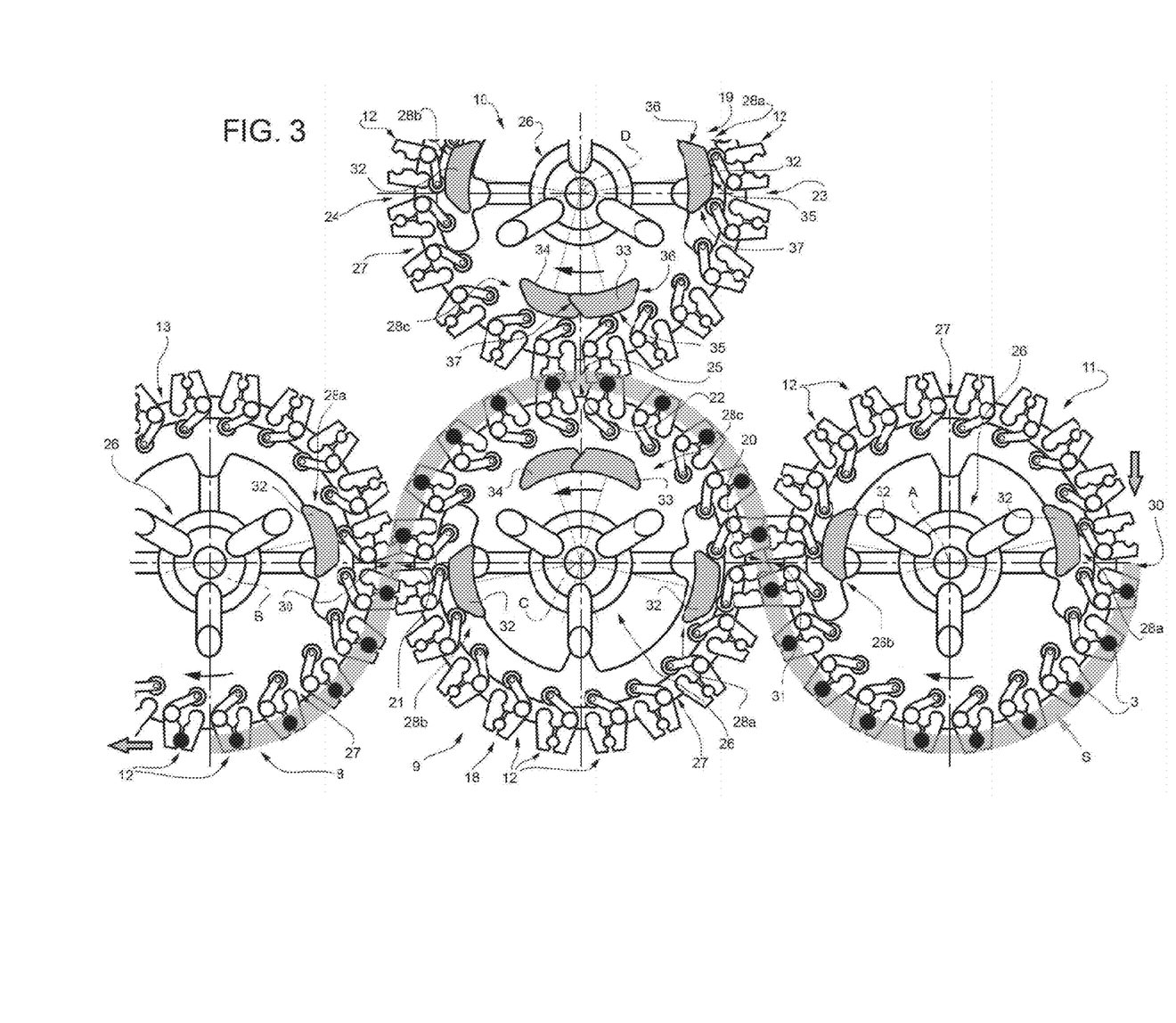

With particular reference to figures from 3 to 5, for each star wheel 11, 13, 18, 19, cam means 28a, 28b act at relative inlet sections 20, 23, 30 and outlet sections 21, 24, 31 and are fixed.

For each star wheel 18, 19, cam means 28c act at relative transfer sections 22, 25 and are displaceable with respect to relative support structure 26 between a forward interaction position with relative clamps 12 and a retracted detachment position from clamps 12; in particular, the above said displacement takes place in a radial direction with respect to axis C, D of relative star wheel 18, 19.

Cam means 28a, 28b are formed by respective cams 32, positioned at inlet sections 20, 23, 30 and outlet sections 21, 24, 31 of relative star wheels 11, 13, 18, 19 and having substantially isosceles trapezoidal profiles. In particular, each cam 32 has a segment 35 adapted to interact with relative clamps 12 and defining the shorter base of the above said substantially trapezoidal profile, and two opposite oblique segments 36, 37, respectively with an ascending slope and a descending slope with reference to the rotation direction of relative star wheel 11, 13, 18, 19; segment 36 has a circumferential development with respect to axis A, B, C, D or relative star wheel 11, 13, 18, 19.

As can be seen in figures from 3 to 5, each cam 32 of cam means 28a, arranged at inlet sections 20, 23, 30, extends mainly upstream of the point in which relative star wheel 11, 13, 18, 19 receives bottles 3 to be conveyed, so as to reach this point in an open position and close back on received bottle 3. Each cam 32 of cam means 28b, arranged at outlet sections 21, 24, 31, extends mainly downstream of the point where relative star wheel 11, 13, 18, 19 releases bottles 3, so as to reach this point in a closed position and open to allow the release of transported bottle 3.

For each star wheel 18, 19, cam means 28c acting at relative transfer section 22, 25 comprise two cams 33, 34 having an identical configuration to that of cams 32 and arranged in positions angularly offset to one another by a predetermined amount with respect to axis C, D of star wheel 18, 19. In particular, cam 33 extends mainly upstream of the point where the transfer of bottles 3 between star wheels 18, 19 takes place, while cam 34 extends mainly downstream of the above said point. Two cams 33, 34 of each star wheel 18, 19 also have an overlapping area of their profiles so as to maintain, in their forward position, relative clamps 12 always in the open position during the passage at relative transfer sections 22, 25.

The first operative configuration of conveyor 9 (FIG. 3) is obtained by arranging both relative cams 33 and 34 in the retracted position so as not to interact with clamps 12 at transfer section 22; the second operative configuration of conveyor 9 (FIG. 4) is instead obtained by arranging relative cam 33 in the retracted position and relative cam 34 in the forward position; the third operative configuration of conveyor 9 (FIG. 5) is finally obtained by arranging relative cam 33 in the forward position and relative cam 34 in the retracted position.

The first operative configuration of conveyor 10 (FIG. 4) is obtained by arranging relative cam 33 in the forward position and relative cam 34 in the retracted position; the second operative configuration of conveyor 10 (FIG. 3) is instead obtained by arranging both relative cams 33 and 34 in the forward position; the third operative configuration of conveyor 10 (FIG. 5) is finally obtained by arranging relative cam 33 in the retracted position and relative cam 34 in the forward position.

In use, in the case of normal operation of conveyor device 1 (FIGS. 1 and 3), bottle 3 coming from upstream machine 4, in the example shown the blower, are fed by star wheels 11 of inlet conveyor 7 until they reach inlet section 20 of switching conveyor 9 and from here are directed directly towards outlet conveyor 8.

In practice, conveyor 9 is arranged in the first operative release configuration of the bottles at outlet section 21 and conveyor 10 is maintained in the second operative inhibition configuration of the transfer of bottles 3 towards reservoir 6 (FIG. 3); in this second operative configuration, conveyor 10 continues to rotate about its axis D and clamps 12 of conveyor 10 are always maintained in the open position at transfer section 25 by the effect of the interaction with relative cams 33, 34.

Once bottles 3 have reached outlet section 21, they are transferred to conveyor 8 to then reach, therethrough, downstream machine 5, in the example shown the filler.

In case malfunctioning occurs so that the use of reservoir 6 is required, for example if downstream machine is stopped, conveyor 9 is switched to the second operative release configuration of bottles 3 at transfer section 22, and conveyor 10 is switched to the first operative configuration (FIG. 4); in the latter configuration, clamps 12 of conveyor 10, which reach the withdrawal point in an open position by the effect of the interaction with relative cam 33, close on relative bottles 3 drawing them towards conveyor 15 of reservoir 6.

Outlet section 21 of conveyor 9 therefore becomes ineffective.

The transfer towards reservoir 6 is continued until the latter is full or until the malfunctioning of downstream machine 5 is solved.

Once normal operation is recovered, reservoir 6 is firstly emptied, arranging conveyors 9 and 10 in the respective operative configurations (FIG. 5), so that bottles 3 fed from conveyor 16 to conveyor 10 at inlet section 23 are released from conveyor 10 to conveyor 9 at respective transfer sections 22, 25. From here, bottles 3 reach outlet section 21 of conveyor 9 and are therefore transferred to conveyor 8 and to downstream machine 5. When the emptying step of reservoir 6 is finished, conveyor 9 is switched to the first operative configuration and conveyor 10 is again arranged in the second operative configuration (FIG. 3) so that bottles 3 are displaced from upstream machine 4 to downstream machine 5 along conveying line R.

It is also possible, in case downstream machine 5 must stop for an especially long time, that bottles 3 are fed from reservoir 6 to another machine of plant 2, similar to machine 5 and not shown in the accompanying drawings.

Figure 2:
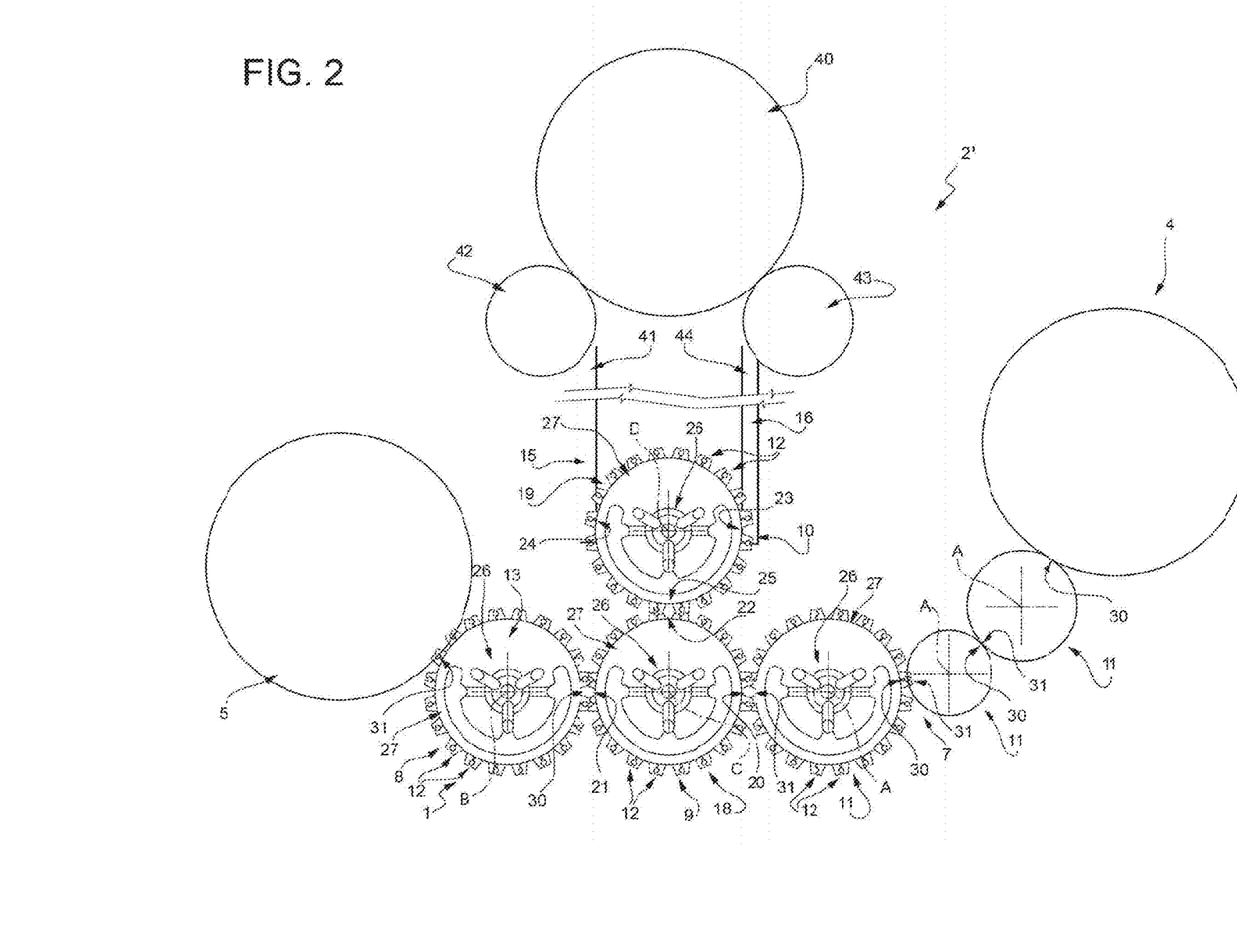
FIG. 2 shows a diagrammatic top view of the conveying apparatus of FIG. 1 using a second type of handling plant.

In FIG. 2 numeral 2' shows as a whole a different type of a handling plant for bottles 3, in which conveying apparatus 1 can be used. Plant 2' will be disclosed hereinafter only as far as it differs from plant 2, indicating with the same reference numerals parts identical or equivalent to parts already disclosed.

In particular, plant 2' differs from plant 2 exclusively by comprising another handling machine indicated by 40, for example another filler or another blower or labeller or a storage for bottles 3, instead of reservoir 6 or in addition to reservoir 6.

In case bottles 3 coming from machine 4 need to be directed towards machine 40, conveyor 9 is arranged in the second operative configuration and conveyor 10 is arranged in the first operative configuration (FIG. 4); thereby, bottles 3 reach conveyor 15 and from here, through a series of passages which are not shown and through a further linear conveyor 41 and one or more star wheels 42 (only one of which is indicated in FIG. 2 for simplicity), are fed to machine 40, which could therefore for example be another filler.

In the case in which, instead, bottles 3 need to be directed from machine 40, which could be another blower, towards machine 5, conveyors 9 and 10 are arranged in the respective third operative configurations (FIG. 5); thereby, bottles 3 coming out from machine 40, through one or more star wheels 43 (only one of which is shown in FIG. 2 for simplicity) reach a linear conveyor 44 and from here, through a series of passages (not shown), are directed onto conveyor 16 to then reach machine 5 through conveyors 10, 9 and 8.

Figure 6:
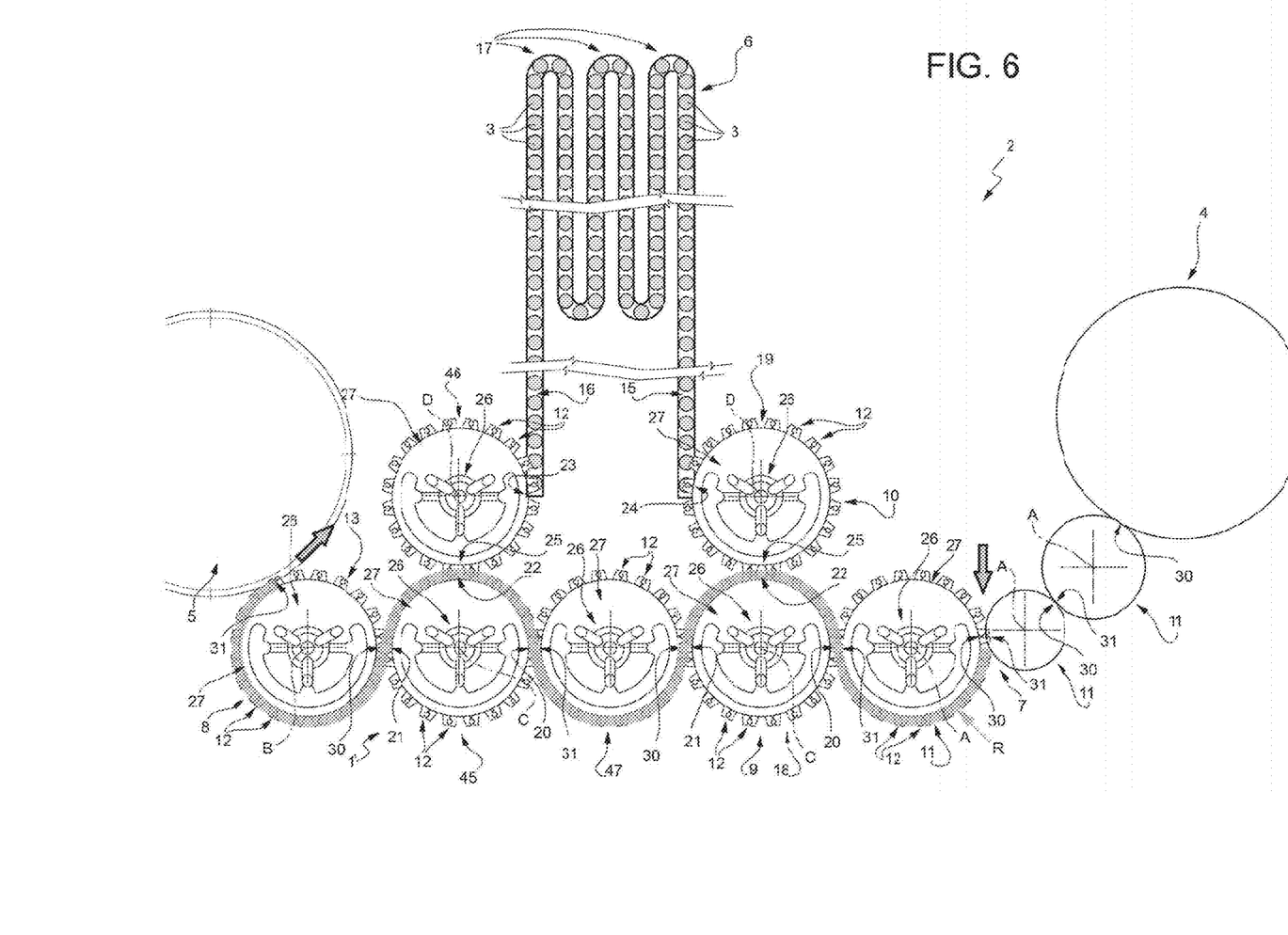
FIGS. 6 and 7 show a diagrammatic top view of another example of a conveying apparatus for articles, made according to the present subject matter, used in the first type of handling plant and arranged in two different operative configurations.
Figure 7:
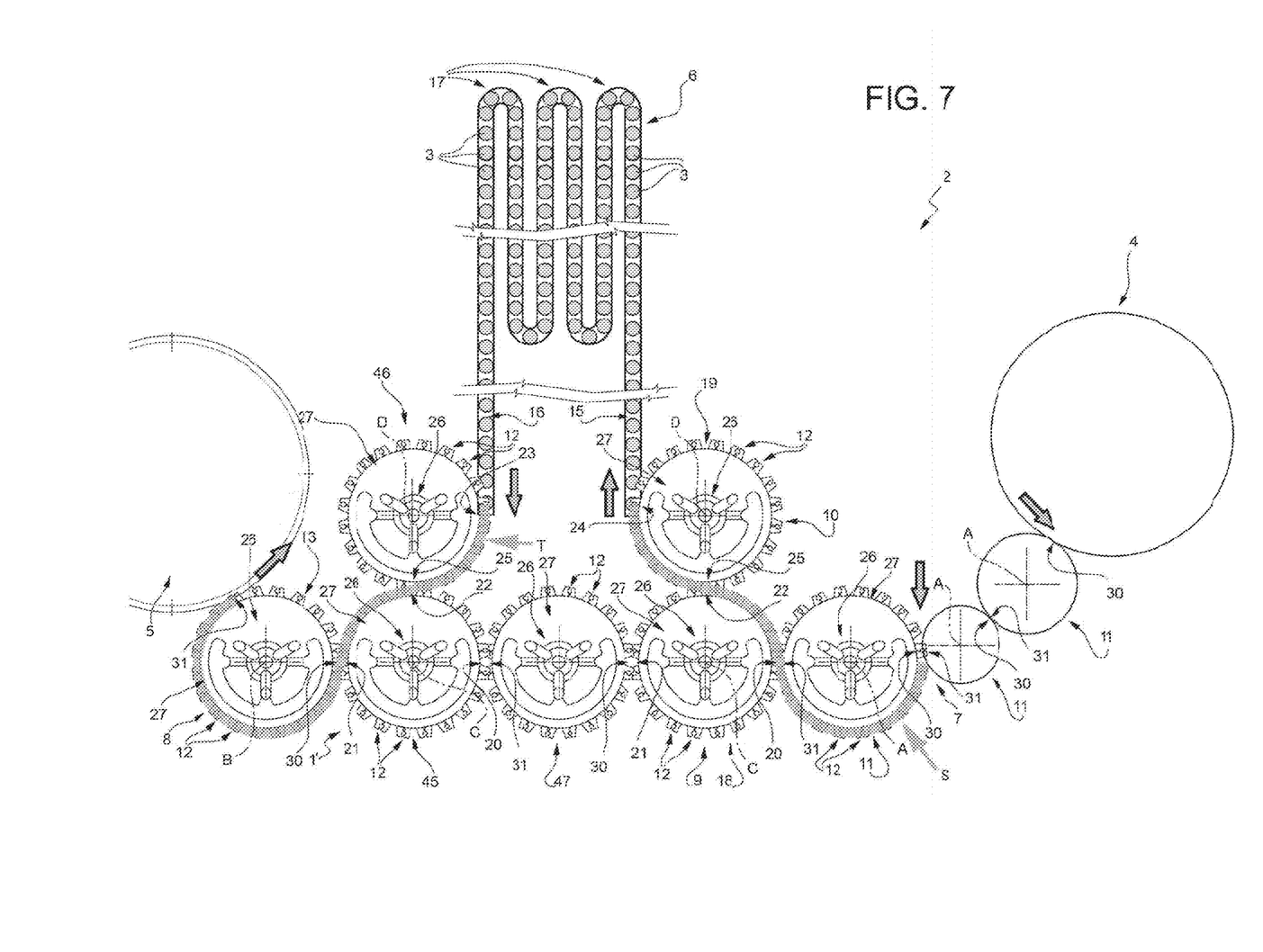
Figure 9:
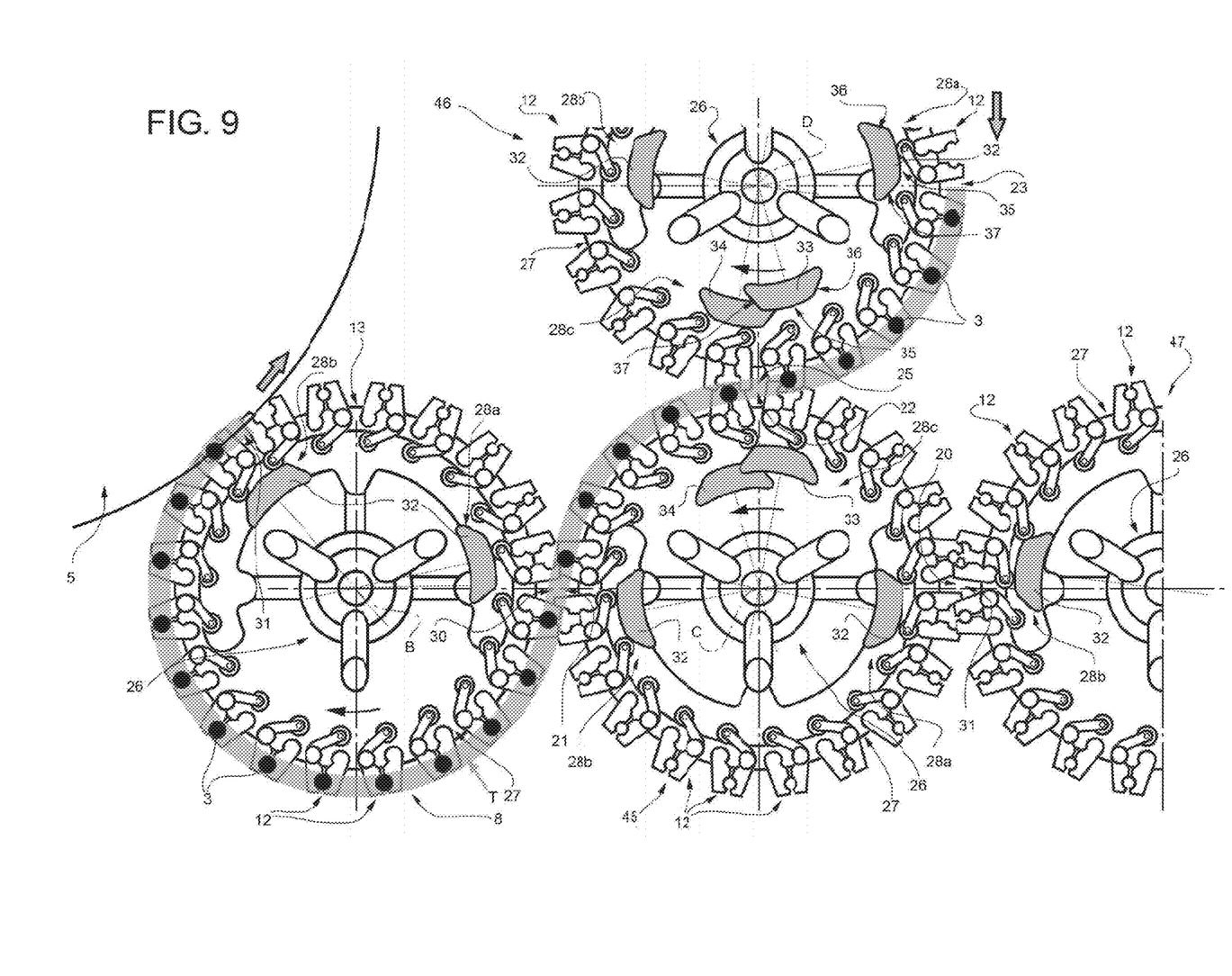
FIG. 9 shows a top diagrammatic view on an enlarged scale of a part of the conveying apparatus of FIG. 7.
Figure 10:
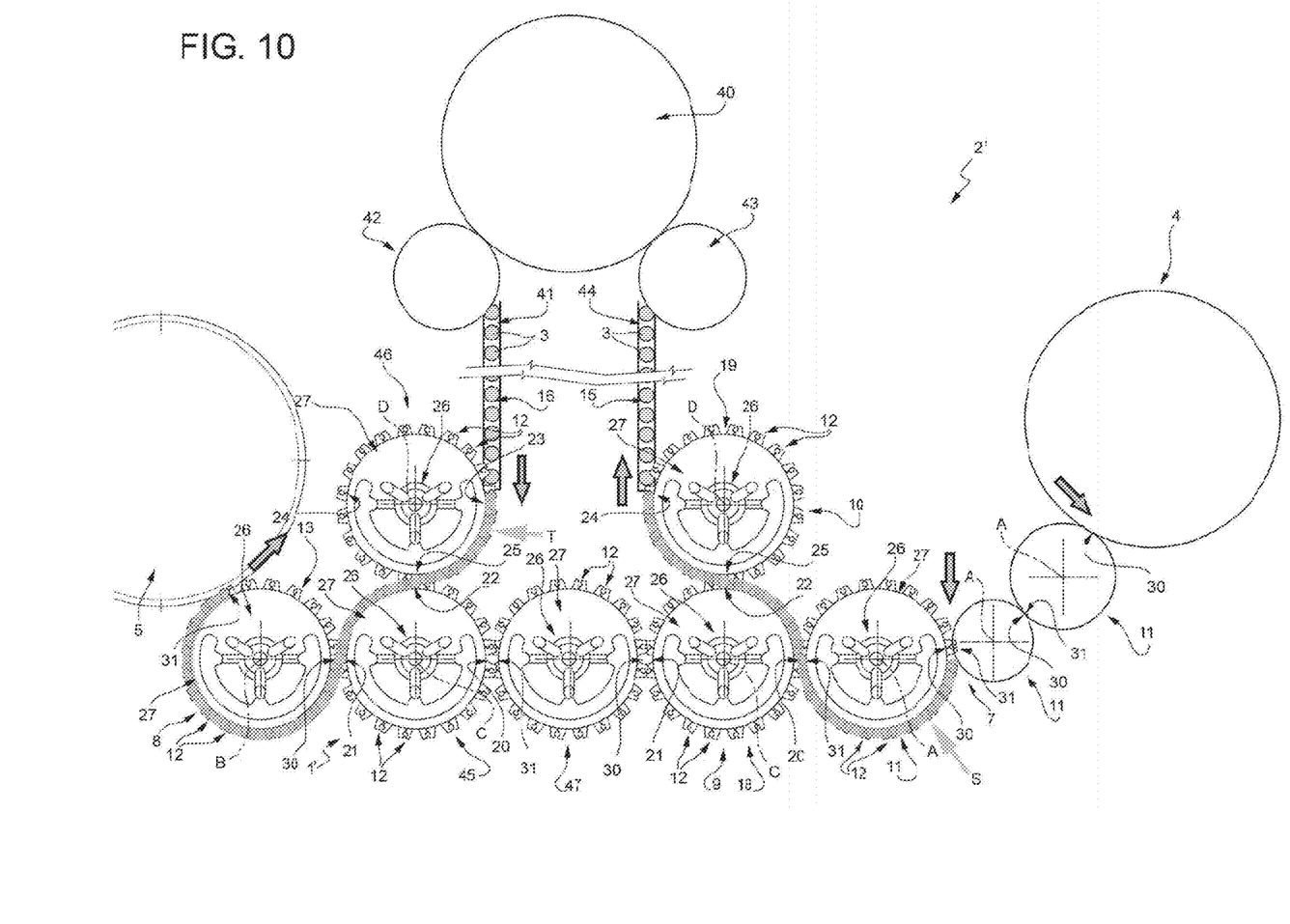
FIG. 10 shows a diagrammatic top view of the conveying apparatus of FIGS. 6 and 7 used in the second type of handling plant and arranged in one of the different possible operative configurations.

In FIGS. 6, 7, and 9 numeral 1' shows as a whole a different embodiment of a conveying apparatus made according to the dictates of the present subject matter; conveying apparatus 1' will be disclosed hereinafter only as far as it differs from conveying apparatus 1, indicating with the same reference numerals parts identical or equivalent to parts already disclosed.

In FIGS. 6 and 7, conveying apparatus 1' is shown when used within handling plant 2, while in FIG. 9, the above said conveying apparatus 1' is shown when used within handling plant 2'.

Conveying apparatus 1' differs from conveying apparatus 1 essentially in that switching conveyors 9 and 10 are used exclusively to displace bottles 3 from upstream machine 4 to downstream machine 5 along conveying line R or from machine 4 to reservoir 6 along conveying line S, and in that conveying line T, from reservoir 6 to machine 5, is obtained through another pair of switching conveyors 45 and 46, totally identical to respective conveyors 9 and 10.

In particular, as can be seen in FIGS. 6 and 7, conveyors 9 and 10 are exclusively used in the respective first and second operative configuration; in practice, bottles 3 can only move on conveyor 9, in case conveyor 9 is arranged in the first operative configuration and conveyor 10 is arranged in the second operative configuration, or can pass from conveyor 9 to conveyor 10 at respective transfer sections 22, 25, in case conveyor 9 is arranged in the second operative configuration and conveyor 10 is arranged in the first operative configuration. Linear conveyor 16 is displaced and feeds new conveyor 46.

In order to maintain on conveyor 45 the same rotation direction of conveyor 9, a star wheel 47 identical to star wheels 11, 13 is interposed between these conveyors.

Therefore, conveyor 45 communicates through its inlet section 20 and star wheel 47 with outlet section 21 of conveyor 9.

Conveyor 45 then communicates with inlet section 30 of conveyor 8 through its outlet section 21 and with transfer section 25 of conveyor 46 through its transfer section 22.

Conveying line R is therefore defined by inlet and outlet sections 20, 21 of conveyors 9 and 45 and by star wheel 47.

Conveyor 46 finally has its inlet section 23 in communication with linear conveyor 16.

Conveyor 45 is selectively set in two distinct operative configurations: a first operative configuration, in which it receives bottles 3 at its inlet section 20 from star wheel 47 and releases them to conveyor 8 at its outlet section 21 (FIG. 8); and a second operative configuration, in which it receives bottles 3 from conveyor 46 at its transfer section 22 and releases them to conveyor 8 at its outlet section 21 (FIG. 9).

In particular, in the first operative configuration of conveyor 45 (FIG. 8), relative clamps 12 are always maintained in the closed position at transfer section 22; in this case, both cams 33, 34 of conveyor 39 are arranged in the retracted position. In the second operative configuration of conveyor 45 (FIG. 9), relative clamps 12 are instead displaced from the open position to the closed position at transfer section 22; in this case, cam 33 of conveyor 45 is arranged in the forward position and cam 34 is arranged in the retracted position.

Figure 8:
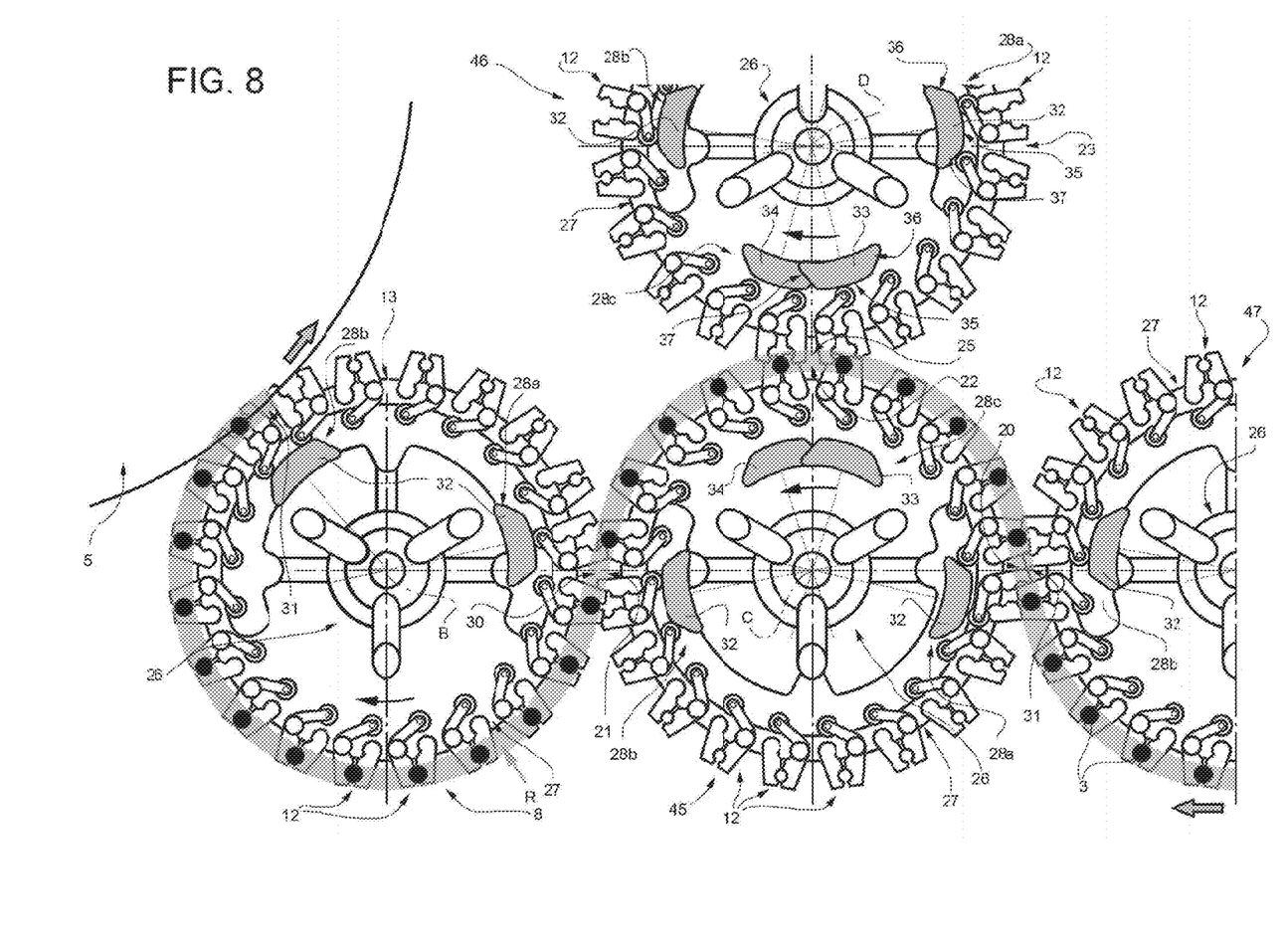
FIG. 8 shows a top diagrammatic view on an enlarged scale of a part of the conveying apparatus of FIG. 6.

Conveyor 46 is selectively set in two distinct operative configurations: a first operative configuration, in which it receives bottles 3 from conveyor 16 at its inlet section 23 and releases them to conveyor 45 at its transfer section 25 (FIG. 9); and a second operative inhibition configuration of the interaction of conveyor 45 (FIG. 8).

The second operative configuration of conveyor 45 and the first operative configuration of conveyor 46 therefore define the conveying line T of bottles 3.

With reference to FIGS. 8 and 9, in the first operative configuration of conveyor 46 (FIG. 9), relative clamps 12 are displaced from the closed position to the open position at transfer section 25; in this case, cam 33 of conveyor 46 is arranged in the retracted position and cam 34 is arranged in the forward position. In the second operative configuration of conveyor 46 (FIG. 8), relative clamps 12 are instead always maintained in the open position at transfer section 25; in this case, both cams 33, 34 of conveyor 46 are arranged in the forward position.

The operation of conveying apparatus 1' is very similar to that of conveying apparatus 1, with the sole difference that conveying lines S and T are made respectively using conveyors 9 and 10 in the first case and conveyors 45 and 46 in the second case.

From an analysis of the features of conveying apparatuses 1 and 1' and of handling plants 2 and 2' made according to the present subject matter, the advantages it allows to obtain are apparent.

In particular, the disclosed solutions allow a broad flexibility in the application of machines 4, 5, 40 of plants 2, 2' and a significant reduction of the number of bottles 3 discarded during production; three different trajectories are indeed possible for bottles 3 coming from one of the handling machines of plant 2, 2' arranged upstream with reference to the handling process carried out on bottles 3 (machine 4 or machine 40).

Furthermore, different machines 4, 5, 40 can operate in different ways and with different types of bottles 3; for example machine 4 could operate with a certain type of bottle 3 at a certain speed and machine 5 could operate with a different type of bottle 3 at a different speed.

In practice, conveying device 1, 1' according to the present subject matter allows completely independent operations by machines 4, 5, 40 of plant 2, 2'.

It should also be noted that, as already said previously, the presence of reservoir 6 allows, in case one of machines 4, 5, 40 of plant 2, 2' stops, to continue the production by operating on the other machines of the plant, without generating discards.

Finally, it is apparent that modifications and variants may be made to conveying apparatuses 1, 1' and to handling plants 2, 2' disclosed and shown herein without because of this departing from the scope of protection defined by the claims.

The invention claimed is:

1. A conveying apparatus for articles, comprising:
    a first conveyor having an inlet section to receive articles to be conveyed and an outlet section for the articles, defining with said inlet section, a first conveying line (R) of said articles; and
    a second conveyor having a transfer section which can be selectively set in communication with a transfer section of said first conveyor, said transfer section of said first conveyor being interposed between said inlet section and said outlet section along said first conveying line (R);
    said first conveyor being selectively set in a first operative release configuration to release said articles at said outlet section and to at least one second operative release configuration to release said articles at its transfer section; and
    said second conveyor being selectively set in a first operative withdrawal configuration to withdraw said articles from said first conveyor at its transfer section and in at least one second operative inhibition configuration to inhibit such withdrawal, said second operative configuration of said first conveyor and said first operative configuration of said second conveyor defining a second conveying line (S) of said articles distinct from said first conveying line (R),
    wherein said first and second conveyors include star wheels peripherally provided with a plurality of gripping clamps selectively displaceable between a closed position on the relative articles and an open or release position from the articles,
    wherein each said star wheel comprises a fixed support structure, a rotating part rotatably mounted on said support structure and provided with said clamps, and cam means borne by said support structure at the relative said inlet sections, outlet sections and transfer sections, the cam means for interacting with said clamps to displace them between said open and closed positions,
    wherein at least one of said cam means is displaceable with respect to the relative said support structure between a forward interaction position with the relative said clamps and a retracted detachment position from the clamps, and
    wherein said cam means comprise two cams having an overlapping area of their profiles so as to maintain, in their forward position, a relative clamp of the plurality of gripping clamps always in the open position during the passage of said articles at relative said transfer section.

2. The apparatus according to claim 1, wherein, in said first operative configuration, the clamps of said first conveyor are arranged in the closed position at the relative said transfer section, and wherein, in said second operative configuration, the clamps of said first conveyor are displaced from said closed position to said open position at the relative said transfer section.

3. The apparatus according to claim 1, wherein, in said first operative configuration, the clamps of said second conveyor are displaced from said open position to said closed position at the relative transfer section, and wherein, in said second operative configuration, the clamps of said second conveyor are arranged in said open position at the relative said transfer section.

4. The apparatus according to claim 1, wherein said second conveyor also comprises an inlet section to receive articles to be conveyed and is selectively set in a third operative release configuration of said articles at its transfer section, and wherein said first conveyor is selectively set in a third operative receiving configuration of said articles from said second conveyor at its transfer section; said third operative configurations of said first and second conveyor defining a third conveying line (T) of said articles, distinct from said first and second conveying lines (R, S).

5. The apparatus according to claim 4, wherein, in said third operative configuration of said first conveyor, the relative clamps are displaced from said open position to said closed position at the relative said transfer section, and wherein, in said third operative configuration of said second conveyor, the relative clamps are displaced from said closed position to said open position at the relative said transfer section.

6. The apparatus according to claim 1, also comprising:
a third conveyor having an inlet section communicating with the outlet section of the first conveyor, and an outlet section of the articles, defining with the inlet section of the third conveyor and with the inlet and outlet sections of the first conveyor of said first conveyor line (R); and
a fourth conveyor having an inlet section to receive the articles to be conveyed and a transfer section which can be selectively set to be in communication with a transfer section of said third conveyor, said transfer section of said third conveyor being interposed between said inlet and outlet sections of the third conveyor along said first conveyor line (R);
said third conveyor being selectively set in a first operative receiving configuration of said articles at its inlet section and in at least one second operative receiving configuration of said articles at its transfer section;
said fourth conveyor being selectively set in a first operative release configuration, at its transfer section, of the articles received at its inlet section, and in at least one second operative inhibition configuration of the interaction with said third conveyor, said second operative configuration of said third conveyor and said first operative configuration of said fourth conveyor defining a third conveying line (T) of said articles distinct from said first and second conveying line (R, S).

7. The apparatus according to claim 6, wherein said third and fourth conveyor are star wheels peripherally provided with a plurality of gripping clamps selectively displaceable between a closed position on the relative articles and an open or release position from the articles.

8. The apparatus according to claim 7, wherein, in said first operative configuration, the clamps of said third conveyor are arranged in the closed position at its transfer section, and wherein, in said second operative configuration, the clamps of said first conveyor are displaced from said open position to said closed position at its transfer section.

9. The apparatus according to claim 7, wherein, in said first operative configuration, the clamps of said fourth conveyor are displaced from said closed position to said open position at the relative said transfer section, and wherein, in said second operative configuration, the clamps of said fourth conveyor are arranged in said open position at said relative said transfer section.

10. The apparatus according to claim 1, wherein, for each said star wheel, the cam means acting at the relative said inlet and outlet sections are fixed, and the cam means acting at the relative said transfer sections are displaceable with respect to said support structure between a forward interaction position with said clamps and a retracted detachment position from the clamps.

11. The apparatus according to 1, wherein said clamps of each star wheel are normally arranged in a closed position and are displaced in the open position by the effect of the interaction with relative cam means.

12. A plant for handling articles comprising:
a first machine;
a second machine arranged downstream of said first machine with reference to the handling process said articles have been subjected to;
a load;
a first conveyor having an inlet section to receive articles to be conveyed and an outlet section for the articles, defining with said inlet section, a first conveying line (R) of said articles, with the first conveying line (R) connecting said first machine to said second machine; and
a second conveyor having a transfer section which can be selectively set in communication with a transfer section of said first conveyor, said transfer section of said first conveyor being interposed between said inlet section and said outlet section along said first conveying line (R);
said first conveyor being selectively set in a first operative release configuration to release said articles at said outlet section and to at least one second operative release configuration to release said articles at its transfer section; and
said second conveyor being selectively set in a first operative withdrawal configuration to withdraw said articles from said first conveyor at its transfer section and in at least one second operative inhibition configuration to inhibit such withdrawal, said second operative configuration of said first conveyor and said first operative configuration of said second conveyor defining a second conveying line (S) of said articles distinct from said first conveying line (R),
wherein said first and second conveyors include star wheels peripherally provided with a plurality of gripping clamps selectively displaceable between a closed position on the relative articles and an open or release position from the articles,
wherein each said star wheel comprises a fixed support structure, a rotating part rotatably mounted on said support structure and provided with said clamps, and cam means borne by said support structure at the relative said inlet sections, outlet sections and transfer sections, the cam means for interacting with said clamps to displace them between said open and closed positions,
wherein at least one of said cam means is displaceable with respect to the relative said support structure between a forward interaction position with the relative said clamps and a retracted detachment position from the clamps,
wherein said cam means comprise two cams having an overlapping area of their profiles so as to maintain, in their forward position, a relative clamp of the plurality of gripping clamps always in the open position during the passage at relative said transfer section, and comprising:
at least one of a second conveying line (S) and third conveying line (T) to selectively connect at least one of said first machine and said second machine to said load.

13. The plant according to claim 12, wherein said load is one of a third machine and a reservoir to temporarily accumulate said articles.

14. A conveying apparatus for articles, comprising:
- a first conveyor having an inlet section to receive articles to be conveyed and an outlet section for the articles, defining with said inlet section, a first conveying line (R) of said articles; and
- a second conveyor having a transfer section which can be selectively set in communication with a transfer section of said first conveyor, said transfer section of said first conveyor being interposed between said inlet section and said outlet section along said first conveying line (R);
- said first conveyor being selectively set in a first operative release configuration to release said articles at said outlet section and to at least one second operative release configuration to release said articles at its transfer section; and
- said second conveyor being selectively set in a first operative withdrawal configuration to withdraw said articles from said first conveyor at its transfer section and in at least one second operative inhibition configuration to inhibit such withdrawal, said second operative configuration of said first conveyor and said first operative configuration of said second conveyor defining a second conveying line (S) of said articles distinct from said first conveying line (R),
- wherein said first and second conveyors include star wheels peripherally provided with a plurality of gripping clamps selectively displaceable between a closed position on the relative articles and an open or release position from the articles,
- wherein each said star wheel comprises a fixed support structure, a rotating part rotatably mounted on said support structure and provided with said clamps, and at relative inlet sections, outlet sections and transfer sections, two cam coupled to the support structure to interact with said clamps to displace them between said open and closed positions,
- wherein each cam pair is displaceable with respect to the relative said support structure between a forward interaction position with the relative said clamps and a retracted detachment position from the clamps, and
- wherein the two cams comprise two cams having an overlapping area of their profiles so as to maintain, in their forward position, a relative clamp of the plurality of gripping clamps always in the open position during the passage at relative said transfer section.

* * * * *

UNITED STATES PATENT AND TRADEMARK OFFICE
CERTIFICATE OF CORRECTION

| | | |
|---|---|---|
| PATENT NO. | : 8,657,101 B2 | Page 1 of 1 |
| APPLICATION NO. | : 13/713878 | |
| DATED | : February 25, 2014 | |
| INVENTOR(S) | : Zoni et al. | |

It is certified that error appears in the above-identified patent and that said Letters Patent is hereby corrected as shown below:

On the title page item [54], and in the specification, column 1, line 4, delete "APPARTUS" and insert --APPARATUS--, therefor Signed and Sealed this
Fourteenth Day of July, 2015

Michelle K. Lee
*Director of the United States Patent and Trademark Office*